(12) United States Patent
Nakayashiki et al.

(10) Patent No.: US 7,543,693 B2
(45) Date of Patent: Jun. 9, 2009

(54) NEUTRAL CONTROL APPARATUS AND METHOD FOR A VEHICLE WITH AN AUTOMATIC TRANSMISSION

(75) Inventors: Makoto Nakayashiki, Toyota (JP); Kazuyuki Watanabe, Anjo (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 433 days.

(21) Appl. No.: 11/448,879

(22) Filed: Jun. 8, 2006

(65) Prior Publication Data

US 2006/0293146 A1    Dec. 28, 2006

(30) Foreign Application Priority Data

Jun. 28, 2005   (JP) .............................. 2005-187711

(51) Int. Cl.
*F16H 61/20* (2006.01)
*F16H 59/72* (2006.01)

(52) U.S. Cl. ............................ 192/3.21; 477/98; 701/51

(58) Field of Classification Search .................... None
See application file for complete search history.

(56) References Cited

U.S. PATENT DOCUMENTS

2004/0242360 A1* 12/2004 Nakayashiki et al. ........ 475/120
2005/0222734 A1* 10/2005 Akaike .......................... 701/51

FOREIGN PATENT DOCUMENTS

JP    2004-353844    12/2004

* cited by examiner

*Primary Examiner*—Rodney H Bonck
(74) *Attorney, Agent, or Firm*—Oblon, Spivak, McClelland, Maier & Neustadt, P.C.

(57) ABSTRACT

The temperature of a friction engagement device of an automatic transmission is estimated, and the target speed ratio of a torque converter increases as the estimated temperature of the friction engagement device increases. The engagement load of the friction engagement device is then controlled so as to achieve the increased target speed ratio of the torque converter.

13 Claims, 11 Drawing Sheets

FIG.2

|     | C1 | C2 | C3 | C4 | B1 | B2 | B3 | B4 | F0 | F1 | F2 | F3 |
|-----|----|----|----|----|----|----|----|----|----|----|----|----|
| Rev |    |    | O  |    | △  |    |    | O  |    | O  |    |    |
| N   |    |    |    |    |    |    |    |    |    |    |    |    |
| 1st | O  |    |    | △  |    |    |    | △  | O  |    |    | O  |
| 2nd | O  |    |    | △  |    | △  | O  |    | O  | O  | O  |    |
| 3rd | O  |    | O  | △  | △  |    | ●  |    | O  | O  |    |    |
| 4th | O  | O  | ●  | △  |    |    | ●  |    | O  |    |    |    |
| 5th | ●  | O  | O  |    | O  |    | ●  |    |    |    |    |    |
| 6th | ●  | O  |    |    | ●  | O  | ●  |    |    |    |    |    |

FIG. 11A

K1_map

|  | $e_1$ | $e_2$ | $e_3$ | $e_4$ | $\cdots$ | $e_n$ |
|---|---|---|---|---|---|---|
| $NE_1$ | $K1_{11}$ | $K1_{12}$ | $K1_{13}$ | $\cdots$ |  | $\cdots$ |
| $NE_2$ | $K1_{21}$ | $K1_{22}$ | $K1_{23}$ | $\cdots$ |  | $\cdots$ |
| $\vdots$ | $\cdots$ | $\cdots$ | $\cdots$ | $\cdots$ |  | $\cdots$ |
| $NE_m$ | $\cdots$ | $\cdots$ | $\cdots$ | $\cdots$ |  | $\cdots$ |

FIG. 11B

K2_map

| $T_{OIL1}$ | $T_{OIL2}$ | $T_{OIL3}$ | $T_{OIL4}$ | $\cdots$ | $T_{OILn}$ |
|---|---|---|---|---|---|
| $K2_1$ | $K2_2$ | $K2_3$ | $\cdots$ |  | $\cdots$ |

FIG. 11C

K3_map

| $tN_1$ | $tN_2$ | $tN_3$ | $tN_4$ | $\cdots$ | $tN_n$ |
|---|---|---|---|---|---|
| $K3_1$ | $K3_2$ | $K3_3$ | $\cdots$ |  | $\cdots$ |

FIG. 11D tmpdw_map

| $\Delta T_1$ | $\Delta T_2$ | $\Delta T_3$ | $\Delta T_4$ | $\cdots$ | $\Delta T_n$ |
|---|---|---|---|---|---|
| $tmpdw_1$ | $tmpdw_2$ | $tmpdw_3$ | $\cdots$ |  | $\cdots$ |

NEUTRAL CONTROL APPARATUS AND METHOD FOR A VEHICLE WITH AN AUTOMATIC TRANSMISSION

INCORPORATION BY REFERENCE

The disclosure of Japanese Patent Application No. 2005-187711 filed on Jun. 28, 2005 including the specification, drawings and abstract is incorporated herein by reference in its entirety.

BACKGROUND OF THE INVENTION

1. Field of the Invention

The invention relates to a neutral control apparatus and method for a vehicle including an automatic transmission, and particularly relates to a neutral control apparatus and method which enable continuation of neutral control of an automatic transmission in a vehicle while maintaining the endurance of a friction engagement device of the automatic transmission.

2. Description of the Related Art

A known neutral control apparatus for an automatic transmission connected to a drive power source via a torque converter includes an engagement pressure regulating device that regulates the load of a friction engagement device of the automatic transmission. When the vehicle is at a standstill, the apparatus performs neutral control by placing the automatic transmission in a neutral state by reducing the load of the friction engagement. As one example of apparatuses of this kind, the neutral control apparatus disclosed in Japanese laid-open patent application No. JP2004-353844 controls the engagement load of a friction engagement device, which is engaged when establishing the first speed at the automatic transmission, according to the torque ratio of the torque converter, and allows a small amount of torque to be transmitted through the friction engagement device during the neutral control so that the load on the drive power source decreases and, as a result, the fuel economy improves while ensuring a good responsiveness of the vehicle when it starts moving. This neutral control apparatus is configured to estimate the temperature of the friction engagement device and cancel the neutral control when the estimated temperature exceeds a reference temperature. This is because if the friction engagement device is kept slipping to transmit a small amount of torque, friction will raise the temperature of the friction engagement device up to a level which may significantly reduce the endurance of the friction engagement device.

Such cancellation of the neutral control, however, reduces the fuel economy. Also, even if the foregoing reference temperature above which the neutral control is cancelled is set to a higher level in order to delay the cancellation of the neutral control and thereby improve the fuel economy, it will result in reduced endurance of the friction engagement.

SUMMARY OF THE INVENTION

It is an object of the invention to improve the fuel economy by enabling continuation of neutral control which applies, during the vehicle being at a standstill, certain engagement load to a friction engagement device of an automatic transmission so that it slips, while maintaining the endurance of the friction engagement device.

To accomplish this object, a first aspect of the invention relates to a neutral control apparatus for an automatic transmission of a vehicle, including an engagement load adjustment device that adjusts an engagement load of a friction engagement device of the automatic transmission, to which drive power is transmitted from a drive power source via a torque converter; and a controller that performs, when the vehicle is at a standstill, a neutral control by reducing the engagement load of the friction engagement device. The controller is adapted to: estimate a temperature of the friction engagement device; set a target speed ratio of the torque converter according to the estimated temperature of the friction engagement device, the target speed ratio being set larger when the estimated temperature of the friction engagement device is higher; and control the engagement load adjustment device so as to achieve the set target speed ratio during the neutral control of the automatic transmission.

According to the above construction, the controller controls the engagement load of the friction engagement device so that the actual speed ratio of the torque converter becomes equal to the target speed ratio, and the target speed ratio is made larger when the estimated temperature of the friction engagement device is higher. That is, the target speed ratio increases with an increase in the estimated temperature of the friction engagement device, and the actual speed ratio of the torque converter then increases according to the increased target speed ratio. At this time, since the engagement load of the friction device decreases down to a level close to a fully neutral state, less friction heat occurs at the friction engagement device. Thus, the endurance of the friction engagement device can be maintained while allowing continuation of the neutral control to improve the fuel economy. Also, because the automatic transmission is not placed in a fully neutral state and the target speed ratio is made smaller when the estimated temperature of the friction engagement device is lower, a sufficient responsiveness can be ensured when starting to propel the vehicle, i.e., when finishing the neutral control and then fully engaging the friction engagement device to propel the vehicle.

In the foregoing apparatus, the controller may be further adapted to continuously increase the target speed ratio as the estimated temperature of the friction engagement device increases.

In this case, because the target speed ratio of the torque converter continuously increases as the estimated temperature of the friction engagement device increases, it is possible to control the engagement load of the friction engagement device more minutely and accurately according to the estimated temperature of the friction engagement device, which reduces the degree of changes in the engagement load and temperature of the friction engagement device, as compared to, for example, the case where the target speed ratio of the torque converter is simply switched between two levels according to the estimated temperature. As such, it is possible to further enhance the foregoing effects of the invention regarding the responsiveness for starting the vehicle, the endurance of the friction engagement, and the ability to continue the neutral control.

In the foregoing apparatus, the controller may be further adapted to limit the target speed ratio to or below an upper guard value.

In this case, because the target speed ratio is limited to or below the upper guard value and is therefore prevented from exceeding the speed ratio of the fully neutral state, it is possible to avoid the situation where the actual speed ratio becomes unable to increase even if the engagement load of the friction engagement device is sufficiently reduced, and it is also possible to prevent engagement shocks and delays in the vehicle response which may otherwise be caused when the vehicle returns to a normal drive mode from the neutral control with the friction engagement device fully released.

In the foregoing apparatus, the controller may be further adapted to make the aforementioned estimation of the temperature of the friction engagement device based on at least one of a speed ratio of the torque converter, a speed of the drive power source, a temperature of fluid of the automatic transmission, and a time period that the neutral control continues.

A second aspect of the invention relates to a method for performing a neutral control in a vehicle equipped with an automatic transmission. This method includes starting a neutral control by reducing an engagement load of a friction engagement device of the automatic transmission when the vehicle is at a standstill, the friction engagement device being drivingly connected to a drive power source of the vehicle via a torque converter; estimating a temperature of the friction engagement device; increasing a target speed ratio of the torque converter as the estimated temperature of the friction engagement device increases; and adjusting the engagement load of the friction engagement device so as to achieve the increased target speed ratio.

In the foregoing method, increasing the target speed ratio as the estimated temperature of the friction engagement device increases may include increasing the target speed ratio continuously as the estimated temperature of the friction engagement device increases.

Also, the foregoing method may further include determining whether the increased target speed ratio is above an upper guard value and limiting the increased target speed ratio to or below the upper guard value if the increased target speed ratio is above the upper guard value.

In the foregoing method, estimating the temperature of the friction engagement device may include making said estimation based on at least one of a speed ratio of the torque converter, a speed of the drive power source, a temperature of fluid of the automatic transmission, and a time period that the neutral control continues.

According to the foregoing method of the second aspect of the invention, the same advantages and effects as presented above in connection with the neutral control apparatus of the first aspect of the invention can be obtained.

Meanwhile, as well as multiple-speed automatic transmissions such as planetary-gear-based or parallel-shaft-based transmissions, the "automatic transmission" recited above may include, for example, forward-reverse drive switching devices which simply switch among a forward drive more, reverse drive mode, and neutral mode. The "friction engagement device" recited above is a friction engagement device of the automatic transmission which is engaged when establishing a particular speed, such as the first speed, of the automatic transmission, and it may include, for example, an input clutch or brake which is operated to connect the drive power input to or disconnect it from the automatic transmission. As the friction engagement device, it is possible to use, for example, a hydraulically-driven friction engagement device whose engagement load is hydraulically controllable via a solenoid valve, or the like. Examples of such hydraulically-driven friction engagement devices include, but are not limited to, single-disc type or multiple-disc type clutches and brakes which are engaged by an actuator, like a hydraulic cylinder, and belt-type brakes. Note that other device, such as an electromagnetically-driven friction engagement device, can also be used as the friction engagement device.

Estimating the temperature of the friction engagement device can employ known various forms and methods. For example, JP2004-353844 discloses estimating the temperature of a friction engagement device by applying the fluid temperature of the automatic transmission, the time period that the neutral control has continued, the speed ratio of the torque converter, and so on, to a certain control map as parameters, or applying them to particular formulas or expressions.

The speed ratio of the torque converter is the ratio of the output speed (turbine speed) to the input speed (pump speed) of the torque converter (turbine speed/pump speed), which is less than 1.0 when the vehicle is at a standstill without interrupting the input of drive power from the drive power source, and becomes closer to 1.0 in a fully neutral state where no engagement load is applied to the friction engagement device, i.e., no load is given to the output side of the torque converter. The speed ratio of the torque converter, on the other hand, decreases with an increase in the engagement load, and with an increase in the load on the output side of the torque converter. The speed ratio of the torque converter 14 during the fully neutral state where no load is given to the output side of the torque converter changes depending upon the fluid temperature of the hydraulic fluid supplied to the torque converter, i.e., the viscosity of that fluid, the speed of the drive power source, i.e., the input speed of the torque converter, and so on.

Controlling the target speed ratio of the torque converter according to the estimated temperature of the friction engagement device may employ various forms or methods as long as the target speed ratio can be set larger when the estimated temperature of the friction engagement device is lower. For example, the target speed ratio may simply be switched between two levels, or may be switched among three or more levels or continuously changed according to the estimated temperature of the friction engagement device. Also, as one of other examples, the target speed ratio may be repeatedly increased by a specific increment at each cycle or time interval until the estimated temperature of the friction engagement device reaches a desired level.

Further, setting the target speed ratio of the torque converter according to the estimated temperature of the friction engagement device may include obtaining a reference speed ratio by applying the temperature of fluid of the automatic transmission and the rotation speed on the input side of the torque converter to a particular control map, formulas, or expressions, and correcting the obtained reference speed ratio according to the estimated temperature of the friction engagement device. For example, the reference speed ratio may be set somewhat smaller than a speed ratio which is obtained under the fully neutral state where no load is given to on the output side of the torque converter. That is, the reference speed ratio can be set as small as possible to minimize the load on the drive power source while ensuring a desired responsiveness when starting to propel the vehicle. Correcting the reference speed ratio may include obtaining a correction value by applying the estimated temperature of the friction engagement device to a particular map, formulas or expressions, such that the correction value increases with an increase in said estimated temperature, and obtaining the target speed ratio by adding the correction value to the reference speed ratio.

Further, controlling the engagement load of the friction engagement device to achieve the target speed ratio may employ various forms and methods. For example, the engagement load may be controlled so as to achieve the target speed ratio according to the difference between the actual speed ratio and the target speed ratio of the torque converter. For example, the engagement load of the friction engagement device may be adjusted by a particular increment or decrement in accordance with the difference between the actual speed ratio and the target speed ratio and/or the values or ranges of the respective speed ratios.

Further, limiting the target speed ratio to or below the upper guard value as described earlier eliminates or minimizes the possibility that the target speed ratio of the torque converter exceed the speed ratio of the fully neutral state where no load is given to the output side of the torque converter. This prevents the situation where the speed ratio of the torque converter becomes temporarily uncontrollable through the adjustment of the engagement load of the friction engagement device, and the situation where the friction engagement device is fully released. The upper guard value may be set smaller than the speed ratio of the fully neutral state where no load is given to the output side of the torque converter, and larger than the foregoing reference speed ratio, and such an upper guard value may be obtained by, for example, applying the temperature of fluid supplied to the torque converter and the input rotation speed of the torque to a particular control map, formulas, or expressions, as in the foregoing exemplary case for obtaining the reference speed ratio.

Limiting the target speed ratio to or below the upper guard value may employ various forms and methods as long as the target speed ratio can be limited to or below the upper guard value. For example, it is possible to limit the target speed ratio by limiting the foregoing correction value for correcting the reference speed ratio. However, if the correction value is set within the range with which the target speed ratio will not exceed the level corresponding to the upper guard value, it is not necessary to have the structure or process for limiting the target speed ratio as described above.

Also, the foregoing limitation of the target speed ratio, regardless of how it is implemented, can be advantageously employed where the target speed ratio is repeatedly increased by a particular increment at each cycle or time interval when the temperature of the friction engagement device becomes high.

BRIEF DESCRIPTION OF THE DRAWINGS

The foregoing and/or further objects, features and advantages of the invention will become more apparent from the following description of preferred embodiment with reference to the accompanying drawings, in which like numerals are used to represent like elements and wherein:

FIG. 2 is an engagement chart illustrating the engagement state of each clutch and brake corresponding to each speed of the automatic transmission in FIG. 1;

FIGS. 11A, 11B, 11B, and 11D are exemplary data charts for obtaining an estimated temperature increase tmpup and estimated temperature decrease tmpdw.

DETAILED DESCRIPTION OF THE PREFERRED EMBODIMENTS

Figure 1:
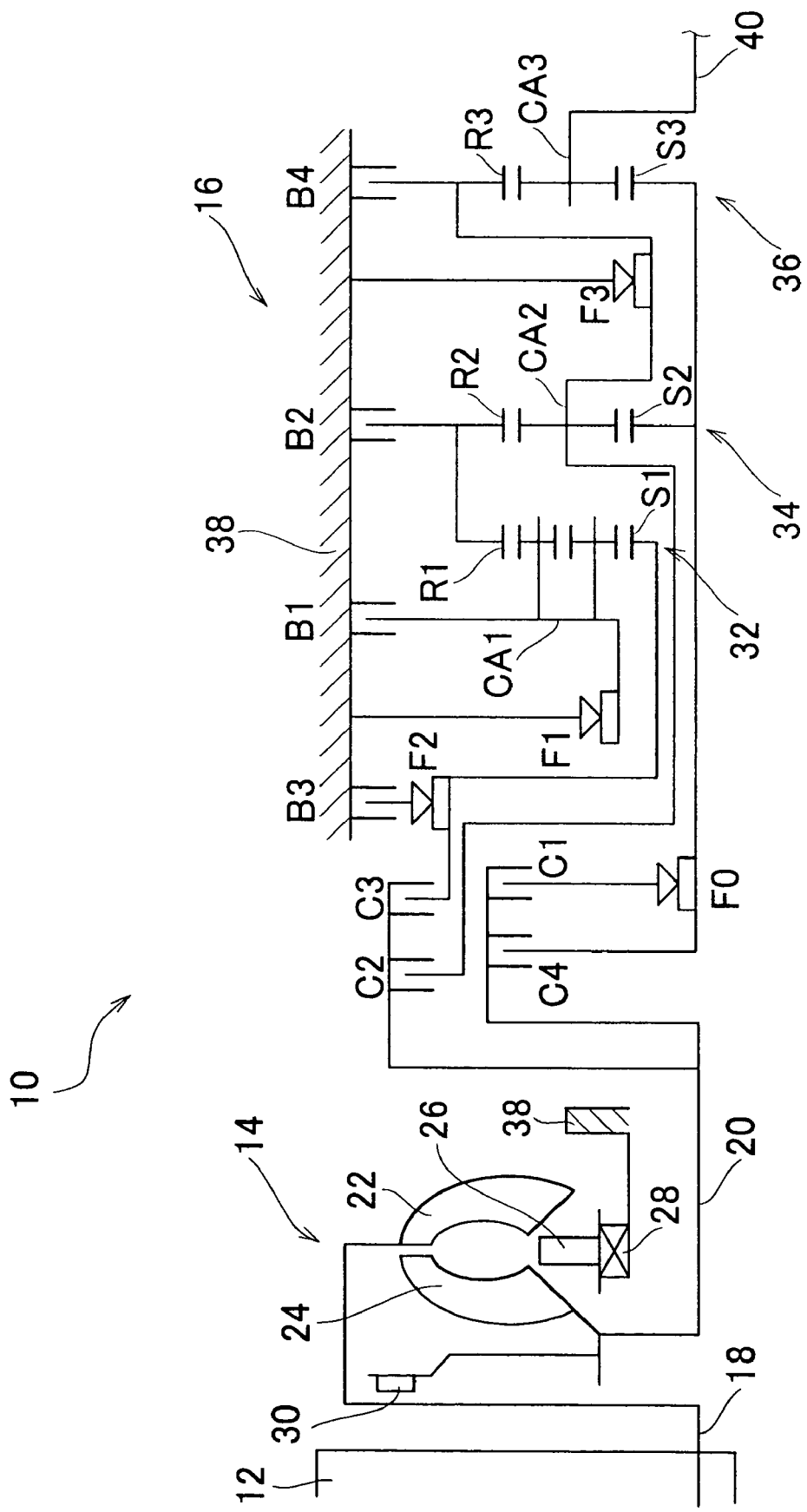
FIG. 1 is a view schematically showing the configuration of a drive power train incorporating a neutral control apparatus according to one exemplary embodiment of the invention.

Hereinafter, exemplary embodiments of the invention will be described with reference to the accompanying drawings. FIG. 1 schematically shows the configuration of a drive power train 10 incorporating a neutral control apparatus according to a first exemplary embodiment of the invention. Referring to FIG. 1, drive power is transmitted from an engine 12, acting as a drive power source for propelling the vehicle, to an automatic transmission 16 through a torque converter 14 which transmits drive power using fluid, and then to traction wheels through a differential gear unit and a drive axle, both not shown.

The engine 12 is an internal combustion engine which includes, but is not limited to, a gasoline engine which produces drive power through combustion of fuel injected into cylinders. The torque converter 14 includes a pump wheel 22 connected to a crank shaft 18 of the engine 12, a turbine wheel 24 connected to an input shaft 20 of the automatic transmission 16, and a stator wheel 26 that is connected to a one-way clutch 28 so as to be rotatable only in one direction with respect to a housing 38 of the automatic transmission 16. Drive power is transmitted between the pump wheel 22 and the turbine wheel 24 through hydraulic fluid. A lock-up clutch 30 is provided between the pump wheel 22 and the turbine wheel 24, which, when engaged, connects the pump wheel 22 and the turbine wheel 24 to enable direct power transmission therebetween.

The automatic transmission 16 is a planetary-gear-based automatic transmission including a first planetary gear set 32 that is a double-pinion type planetary gear set, and a second and third planetary gear sets 34, 36 which are both a single-pinion type planetary gear set. A sun gear S1 of the first planetary gear set 32 is connectable to the input shaft 20 through a third clutch C3 and to the housing 38 through a one-way clutch F2 and a third brake B3 so that the sun gear S1 does not rotate in the opposite direction to the input shaft 20. A carrier CA1 of the first planetary gear set 32 is connectable to the housing 38 through a first brake B1 and is supported by a one-way clutch F1, which is provided in parallel with the first brake B1, so as not to rotate in the opposite direction to the input shaft 20. A ring gear R1 of the first planetary gear set 32 is integrally coupled to a ring gear R2 of the second planetary gear set 34 and is connectable to the housing 38 through a second brake B2. A sun gear S2 of the second planetary gear set 34 is integrally coupled to a sun gear S3 of the third planetary gear set 36 and is connectable to the input shaft 20 either through a fourth clutch C4 or through a first clutch C1 and a one-way clutch F0 which prevents the sun gear S2 from rotating in the opposite direction to the input shaft 20. A carrier CA2 of the second planetary gear set 34 is coupled to a ring gear R3 of the third planetary gear set 36 and is connectable to the input shaft 20 through a second clutch C2 and to the housing 38 through a fourth brake B4. The carrier CA2 is supported by a one-way clutch F3, which is provided in parallel with the fourth brake B4, so as not to rotate in the opposite direction to the input shaft 20. Finally, a carrier CA3 of the third planetary gear set 36 is integrally coupled to an output shaft 40.

FIG. 2 is a chart illustrating the state of clutches C1-C4 and brakes B1-B4 at each speed of the automatic transmission 16, where empty circles represent an engaged state, blanks a released state, triangles an engaged state for engine brake, and black circles an engaged state unrelated to transmission of drive power. The clutches C1-C4 and brakes B1-B4 are hydraulic friction engagement devices including, but not limited to, known multi-disc type clutches and brakes which are driven by hydraulic actuators. Hereinafter, one or more of the clutches C1-C4 and brakes B1-B4 will be simply, or collectively, referred to as "clutch C" or "brake B" where distinction of a specific one or more of them is not necessary. The engagement of the clutches C and brakes B is controlled through a hydraulic control circuit 82 shown in FIG. 3 which includes solenoid valves S4, SR and linear solenoid valves SL1, SL2, SL3, SLT, SLU. Specifically, each clutch C and brake B is placed in an engaged or released state as illustrated in the chart of FIG. 2 by switching between energizing and de-energizing the solenoid valves S4, SR and adjusting exciting current to the linear solenoid valves SL1, SL2, SL3, SLT, SLU, so as to selectively establish one of six forward speeds "1st" to "6th" and a reverse speed "Rev" according to the position of a shift lever 78 shown in FIG. 3 and certain vehicle running conditions, for example. The speed ratio γ of the automatic transmission 16 (=rotation speed NIN of the input shaft 20/rotation speed NOUT of the output shaft 40) decreases as the automatic transmission 16 shifts from the first speed "1st" up to the sixth speed "6th" and is 1.0 at the fourth speed "4th".

The shift lever 78 has, for example, a parking position "P", reverse position "R", neutral position "N", and forward position "D". When the shift lever 78 is at "N" or "P" position, the automatic transmission 16 is placed in a neutral state where power transmission is interrupted. At "P" position, furthermore, the traction wheels are mechanically locked by a parking mechanism, not shown, so as not to rotate. At "D" position, the forward speeds "1st" to "6th" are selectively established. At "R" position, the reverse speed "Rev" is established.

Figure 3:
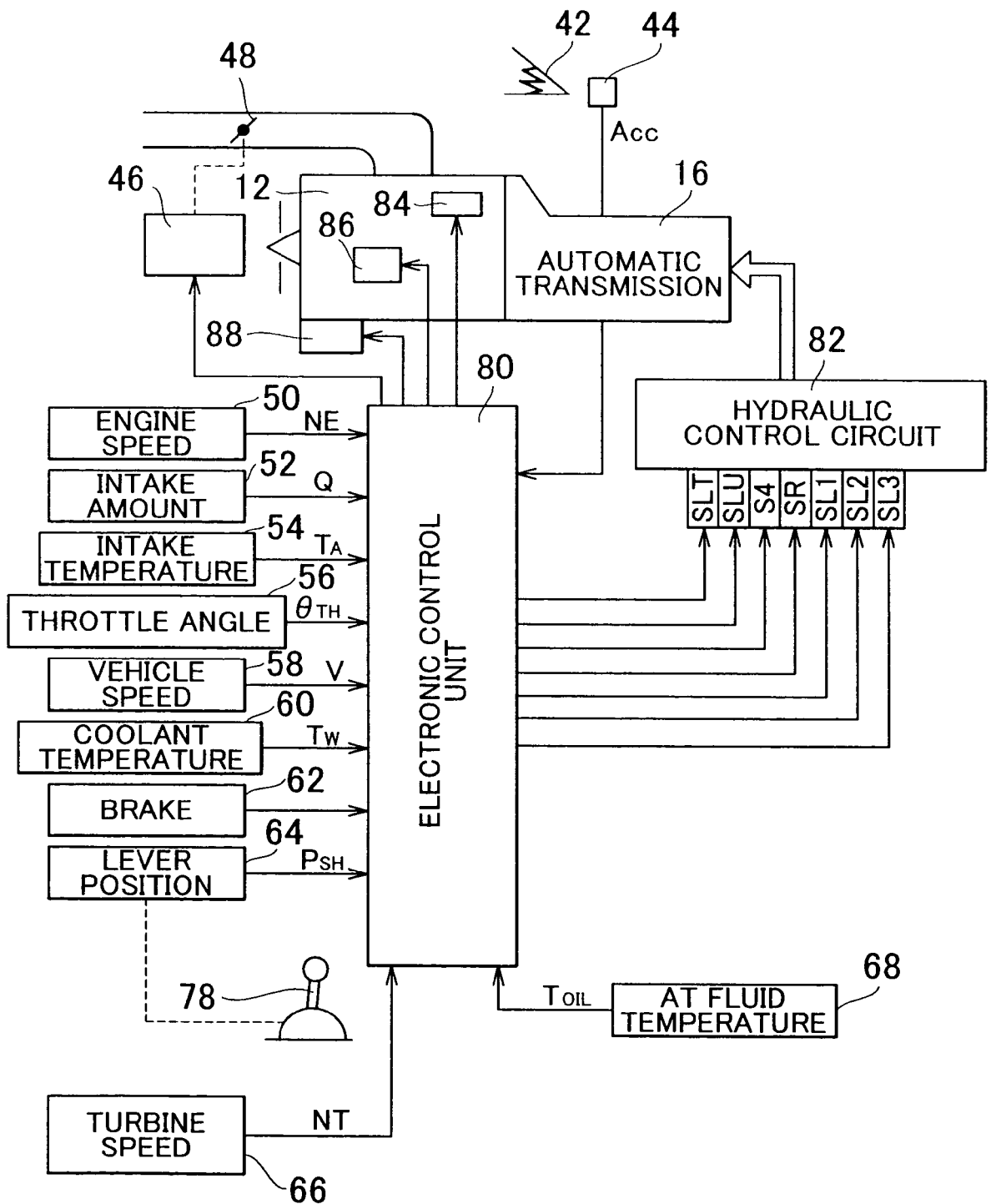
FIG. 3 is a block diagram illustrating a control system incorporated in the vehicle to control the engine in FIG. 1.

FIG. 3 is a block diagram illustrating a control system incorporated in the vehicle to control the engine 12, the automatic transmission 16, and so on. An accelerator sensor 44 is provided to detect an accelerator operation amount ACC, the amount that an accelerator pedal 42 is stepped down by the driver. Within the intake passage of the engine 12 is an electronic throttle valve 48 having a throttle angle θTH that is controlled by a throttle actuator 46 so as to achieve an idle speed NEIDL of the engine 12 or to be equal to an angle corresponding to the accelerator operation amount ACC. The control system, as shown in FIG. 3, includes various other devices and components such as (a) an engine speed sensor 50 that detects an engine speed NE of the engine 12, (b) an intake sensor 52 that detects an intake amount Q, the amount of air inhaled into the engine 12, (c) an intake temperature sensor 54 that detects an intake temperature TA, the temperature of the inhaled air, (d) a throttle sensor 56 with an idle switch which detects if the electronic throttle valve 48 is fully closed (at the idle position) as well as the throttle angle θTH, (e) a vehicle speed sensor 58 that detects a rotation speed NOUT of the output shaft 40a corresponding to a vehicle speed V, (f) a coolant temperature sensor 60 that detects a coolant temperature TW of the engine 12, (g) a brake switch 62 that detects if a foot brake, as a regular brake of the vehicle, is operated, (h) a lever position sensor 64 that detects a lever position (shift position) PSH of the shift lever 78, (i) a turbine speed sensor 66 that detects the rotation speed NIN of the input shaft 20 corresponding to a turbine speed NT, and (j) an AT fluid temperature sensor 68 that detects an AT fluid temperature TOIL, the temperature of hydraulic fluid in the hydraulic control circuit 82. From these sensors and switches, an electronic control unit 80 receives signals indicating the engine speed NE, intake amount Q, intake temperate TA, throttle angle θTH, vehicle speed V, coolant temperature TW, presence or absence of foot brake operation, lever position PSH, turbine speed NT, AT fluid temperature TOIL, etc.

The electronic control unit 80 includes a microcomputer provided with a CPU, RAM, ROM, input and output interfaces, etc., and is adapted to control the output of the engine 12, shifting of the automatic transmission 16, and so on, by executing various signal processing on control programs pre-stored in the ROM while using the temporary memories of the RAM. Note that the electronic control unit 80 may include separate sections or sub-units for the engine control and the transmission control. When controlling the output of the engine 12, the electronic control unit 80 controls, for example, opening and closing of the electronic throttle valve 48 by way of the throttle actuator 46, the amount of fuel injection from fuel injectors 84, and ignition timings of igniters, not shown. When controlling the electronic throttle valve 48, the throttle actuator 46 is driven based upon a predetermined relationship with the accelerator operation amount ACC where the throttle angle θTH increases as the accelerator operation amount ACC increases. Upon an engine start, the crank shaft 18 of the engine 12 is cranked by a starter 88 which is an electric motor.

Figure 4:
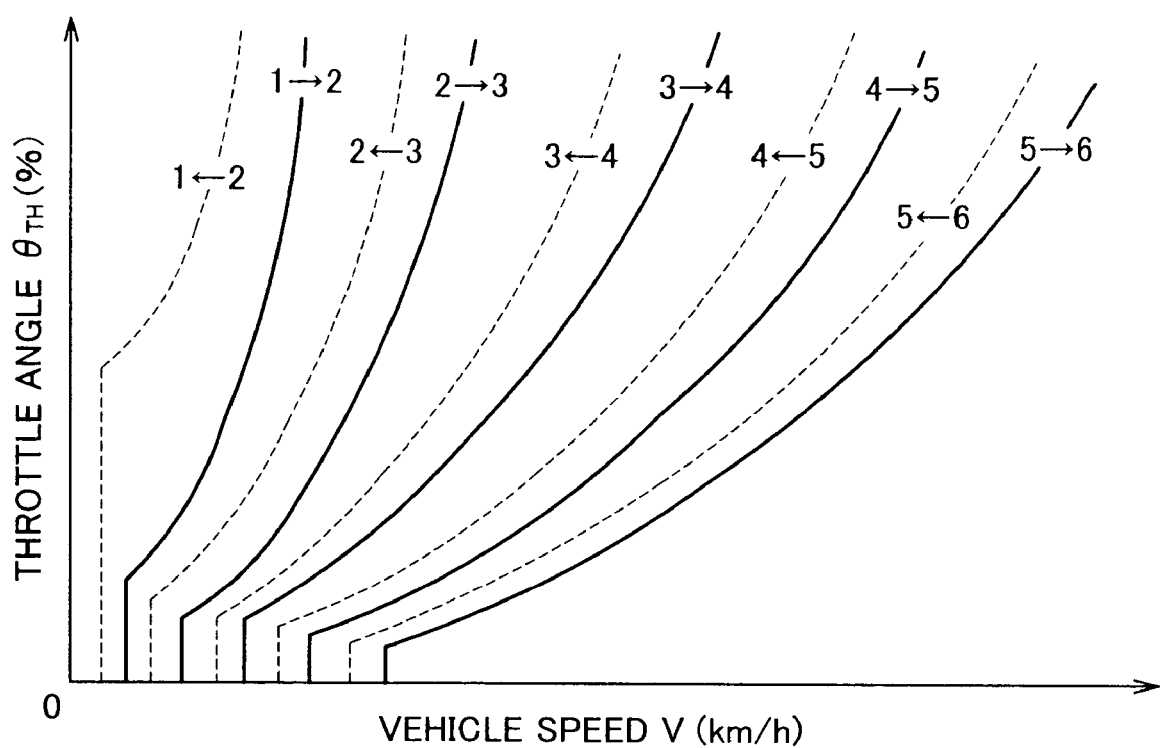
FIG. 4 is one example of a shift control map according to which the electronic control unit in FIG. 1 controls shifting of the automatic transmission.

When controlling shifting of the automatic transmission 16, the engagement state of each clutch C and brake B is changed by switching between energizing and de-energizing each of the solenoid valves S4 and SR and continuously changing the exciting current to each of the linear solenoid valves SL1, SL2, SL3, SLT, SLU, so that one of the forward speeds 1st to 6th is automatically established according to a shift map as shown in FIG. 4 which uses the throttle angle θTH and the vehicle speed V as parameters. In FIG. 4, the solid lines represent up-shift boundaries and the dotted lines represent down-shift boundaries, and the numerals 1 to 6 denote the first to sixth forward speeds, respectively. According to this map, the automatic transmission 16 is shifted to a lower speed having a higher gear ratio γ as the vehicle speed V decreases, and as the throttle angle θTH increases.

Figure 5:
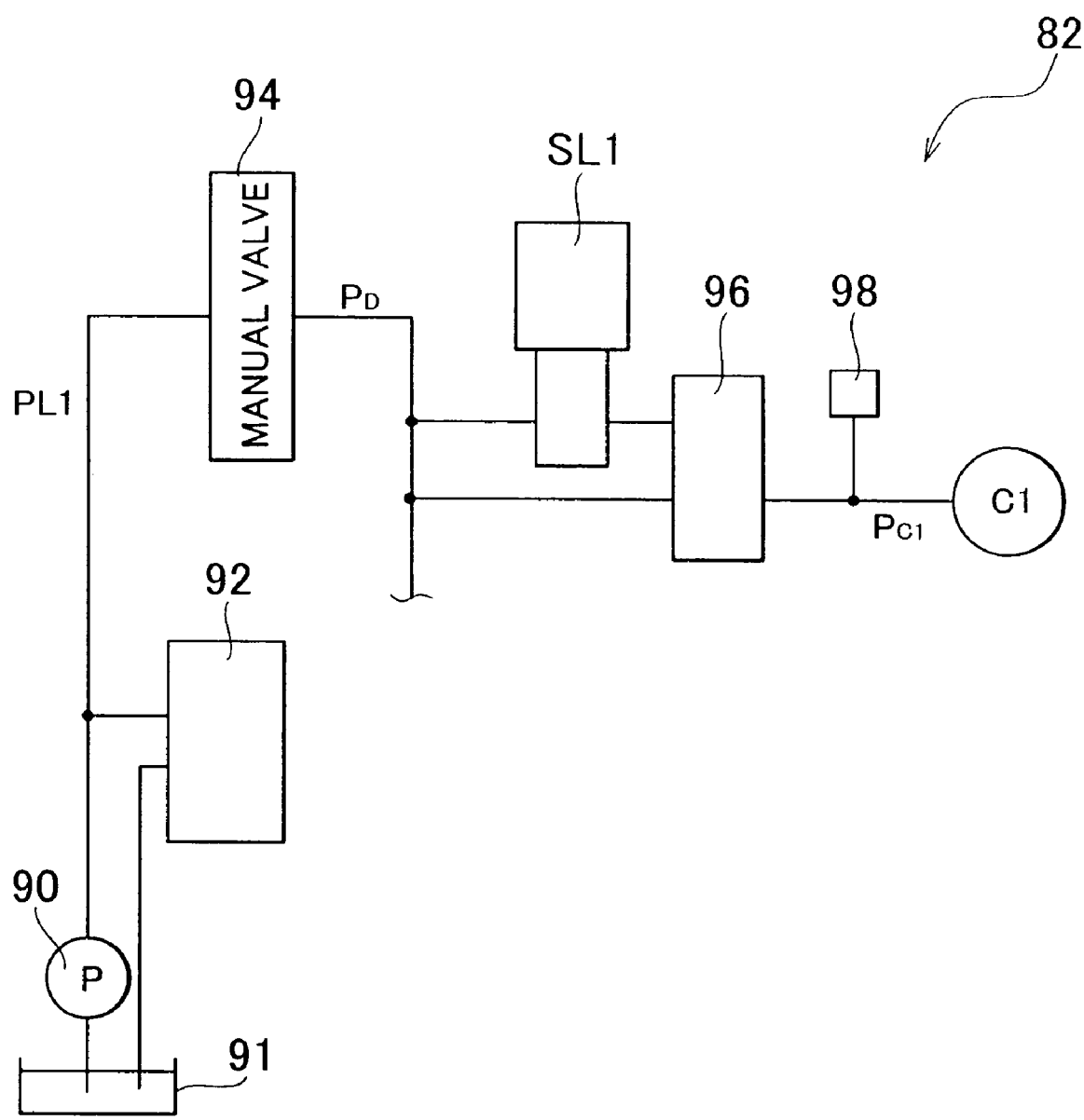
FIG. 5 is a view schematically showing the sections of the hydraulic circuit in FIG. 3 which are associated with the operation of a first clutch C1 to be used in neutral control.

FIG. 5 schematically shows the sections of the hydraulic control circuit 82 which are associated with neutral control of the automatic transmission 16. In the neutral control, the engagement load of the first clutch C1, which is the clutch to be engaged when establishing the first speed "1st", will be controlled during the vehicle being at a standstill with the shift lever 78 at "D" position, namely in the forward drive mode. As shown in FIG. 5, hydraulic fluid is pumped up from a pan 91 by a hydraulic pump 90, and its pressure is then regulated by a first regulator valve 92, which is a pressure relief valve, to equal a first line pressure PL1. Subsequently, the hydraulic fluid is supplied to a manual valve 94 which is operatively linked with the shift lever 78. When the shift lever 78 is at "D" position, forward position pressure PD, which is substantially equal to the first line pressure PL1, is supplied from the manual valve 94 to corresponding solenoid valves including the linear solenoid valves SL1, SL2, SL3, shift valves, controls valves, and so on. The hydraulic fluid is distributed to the first clutch C1 via a control valve 96. The control valve 96 adjusts the hydraulic fluid pressure according to signal pressure produced by the solenoid valve SL1.

Thus, the electronic control unit 80 can continuously change a clutch engagement pressure PC1 to the first clutch C1 by continuously changing the exciting current to the solenoid valve SL1. The clutch engagement pressure PC1 is detected by a hydraulic pressure sensor 98. The first clutch C1 acts as an input clutch when the shift lever 78 is at "D" position and the engagement load of the first clutch C1 is reduced during neutral control.

Not only supplied to the clutches C and brakes B for engaging them, the hydraulic fluid pumped up by the hydraulic pump 90 is also used to lubricate various portions of the automatic transmission 16 and is supplied to the torque converter 14 to enable its torque transmission. After supplied to the automatic transmission 16, the torque converter 14, and so on, the hydraulic fluid is returned to the pan 91 through a fluid cooler, not shown. The temperature of the hydraulic fluid is detected by the AT fluid temperature sensor 68 as an AT fluid temperature TOIL.

Figure 6:
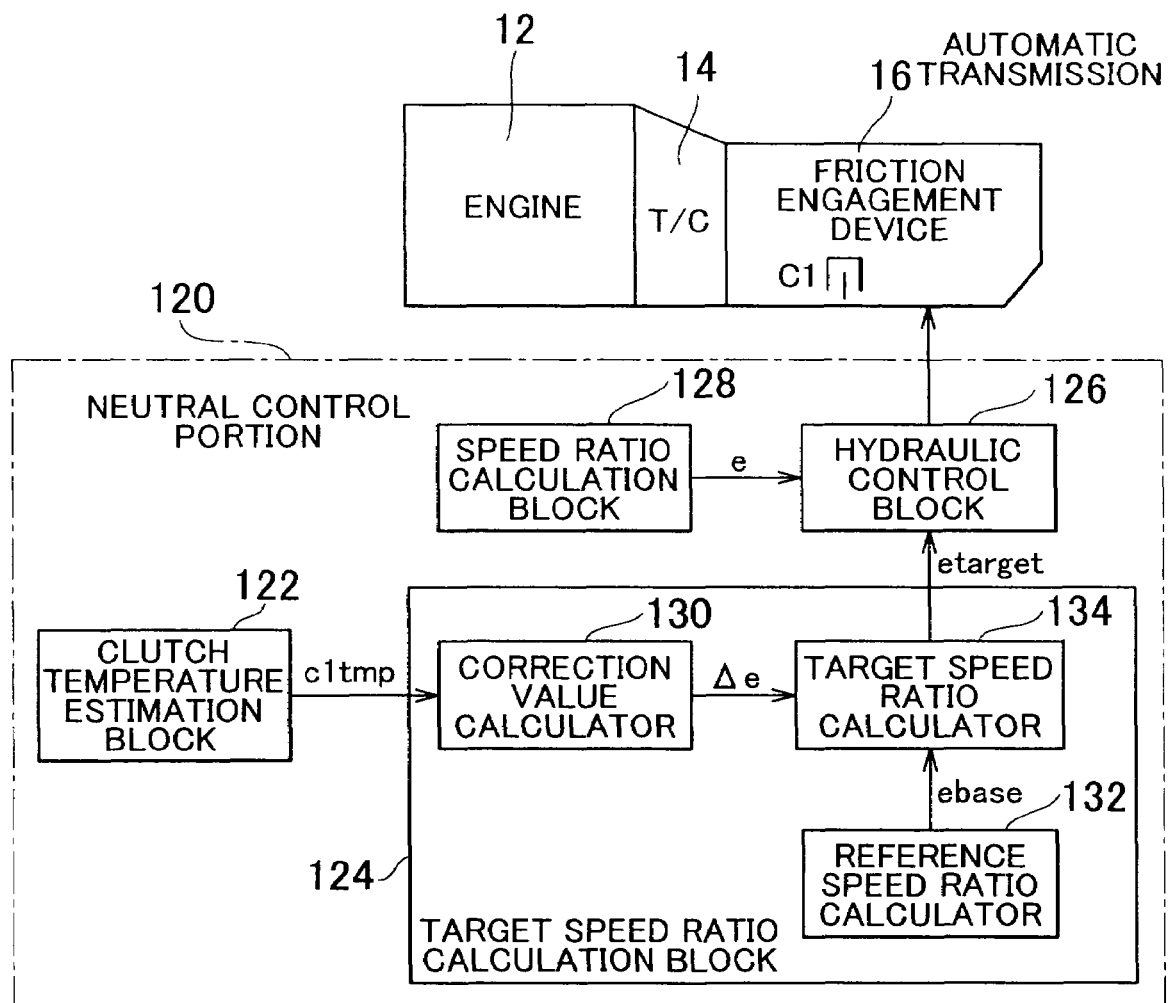
FIG. 6 is a block diagram illustrating functional blocks of a neutral control portion of the electronic control unit in FIG. 3.

Referring to FIG. 6, the electronic control unit 80 includes a neutral control potion 120 including a clutch temperature estimation block 122, target speed ratio setting block 124, hydraulic control block 126, and speed ratio calculation block 128. Within the target speed ratio setting block 124 are provided a correction value calculator 130, reference speed ratio calculator 132, and target speed ratio calculator 134. When performing neutral control, the neutral control portion 120 executes the routines illustrated in FIG. 7 and FIG. 10 to reduce the clutch engagement pressure PC1 to the first clutch C1 as needed. More specifically, the neutral control portion 120 performs feedback control of the clutch engagement pressure PC1 to bring an actual speed ratio e (=NT/NE) of the torque converter 14 to a target speed ratio etarget, as will hereinafter be described in detail. The clutch temperature estimation block 122 repeats calculating (updating) the value of estimated clutch temperature cltmp, the estimated temperature of the first clutch C1, according to the routine of FIG. 10, regardless of whether neutral control is being performed.

Figure 10:
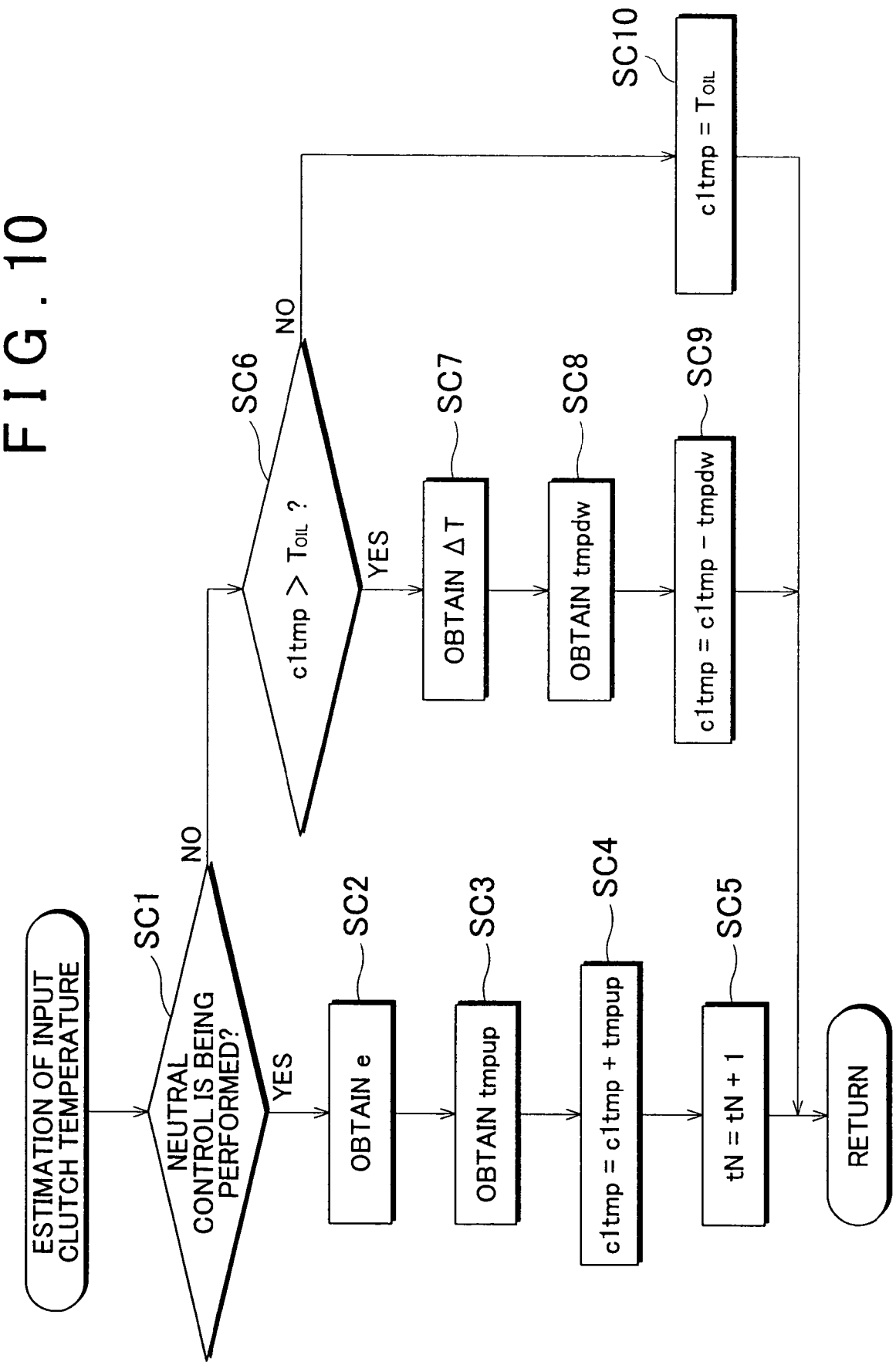
FIG. 10 is a flowchart illustrating a routine executed by the clutch temperature estimation block in FIG. 6.

When the routine of FIG. 10 starts, the neutral control portion 120 first determines in step SC1 whether neutral control is now being performed, by referring to, for example, a neutral control flag which is set and cleared depending on whether neutral control is being performed. If "YES" in step SC1, the neutral control portion 120 executes step SC2 and its subsequent steps. If "NO", the neutral control portion 120 executes step SC6 and its subsequent steps. In step SC2, the neutral control portion 120 obtains the actual speed ratio e of the torque converter 14 (=NT/NE) from the engine speed NE and turbine speed NT. In step SC3, the neutral control portion 120 calculates an estimated temperature increase tmpup of the first clutch C1 based on the actual speed ratio e obtained in step SC2, the engine speed NE, the AT fluid temperature TOIL, and a neutral control continuation period tN indicating the time period that the neutral control has been continuing. At this time, more specifically, the neutral control portion 120 obtains a first coefficient K1 by applying the actual speed ratio e and engine speed NE to the map of FIG. 11A, a second coefficient K2 by applying the AT fluid temperature TOIL to the map of FIG. 11B, and a third coefficient K3 by applying the neutral control continuation period tN to the map of FIG. 11C, respectively. The neutral control portion 120 then calculates the estimated temperature increase tmpup by applying the obtained three coefficients to Expression (1) below.

$$tmpup = K1 \times K2 \times K3 \quad (1)$$

In step SC4, the neutral control portion 120 obtains a new estimated clutch temperature cltmp by adding the estimated temperature increase tmpup obtained in step SC3 to the present estimated clutch temperature cltmp according to Expression (2) below, and updates its record.

$$cltmp = cltmp + tmpup \quad (2)$$

In step SC5, the neutral control portion 120 increments the neutral control continuation period tN by 1.

If "NO" in step SC1, namely when the vehicle is normally running without performing neutral control, the neutral control portion 120 then proceeds to step SC6 and determines if the present estimated clutch temperature cltmp is higher than the AT fluid temperature TOIL. If "YES", the neutral control portion 120 executes step SC7 and its subsequent steps. In step SC7, the neutral control portion 120 obtains a temperature difference ΔT, the difference between the present estimated clutch temperature cltmp and the present AT temperature TOIL (=cltmp−TOIL). Then, the neutral control portion 120 proceeds to step SC8 and calculates an estimated temperature decrease tmpdw, an estimated decrease in the temperature of the first clutch C1, by applying the obtained temperature difference ΔT to the map of FIG. 11D. In step SC9, the neutral control portion 120 obtains a new estimated clutch temperature cltemp by subtracting the estimated temperature decrease tmpdw from the present estimated clutch temperature cltemp according to Expression (3) shown below and updates its record.

$$cltmp = cltmp - tmpdw \quad (3)$$

Back to step SC6, if "NO" in this step, namely if the present estimated clutch temperature cltmp is equal to, or lower than, the AT fluid temperature TOIL, the neutral control portion 120 then proceeds to step SC10 and sets the AT fluid temperature TOIL as a new estimated clutch temperature cltmp.

Meanwhile, the neutral control portion 120 performs neutral control by executing the routine illustrated in FIG. 7, as will hereinafter be described in detail. In step SA1, the neutral control portion 120 determines, by referring to the foregoing neutral control flag, whether neutral control is now being performed. If "YES", the neutral control portion 120 immediately executes step SA4 and its subsequent steps. If "NO", the neutral control portion 120 proceeds to step SA2 and determines whether conditions for starting neutral control are satisfied. The conditions include, but are not limited to, the accelerator pedal 42 being unstepped and the foot brake, not shown, being turned on during the vehicle being at a standstill with the shift lever 78 at "D" position. If the conditions are satisfied, the neutral control portion 120 executes step SA3 and its subsequent steps. If not, the routine returns.

Figure 8:
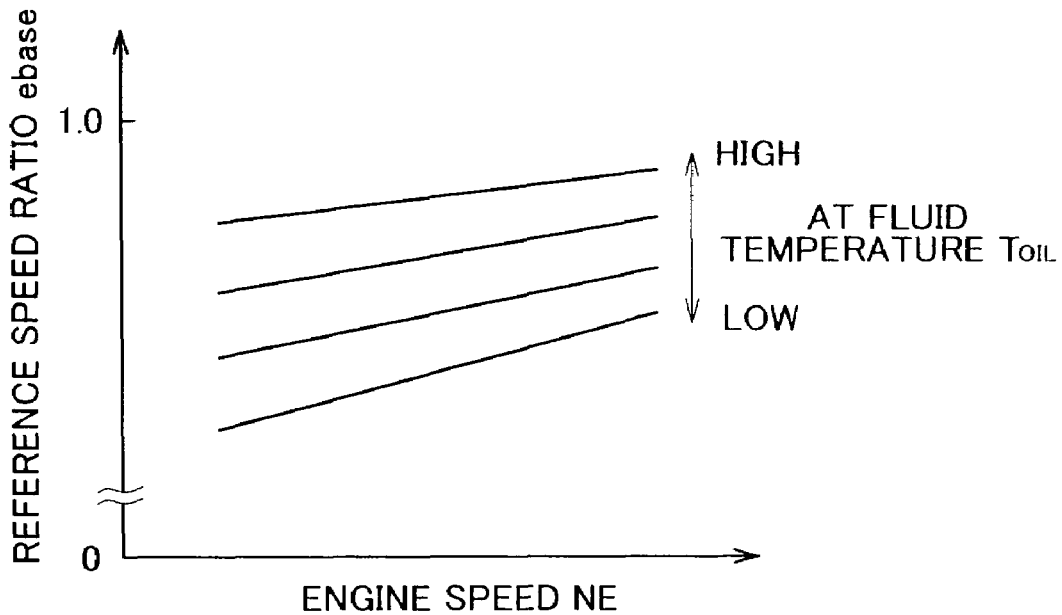
FIG. 8 is one example of a control map for obtaining a reference speed ratio ebase in step SA3 in FIG. 7.

In step SA3, the neutral control portion 120 obtains a reference speed ratio ebase by, for example, applying the present AT temperature TOIL and the present engine speed NE to a map, as shown in FIG. 8, as parameters or applying them to particular formulas or expressions. The reference speed ratio ebase will be used as the basis for determining the target speed ratio etarget according to which the clutch engagement pressure PC1 to the first clutch C1 is controlled through feedback during neutral control. The target speed ratio etarget is set smaller than a speed ratio eN by a specific amount. The speed ratio eN is the speed ratio obtained under fully neutral states where no load is given to the output side of the torque converter 14, i.e., the clutch engagement pressure PC1 to the first clutch C1 is zero. By thus setting the target speed ratio etarget, it is possible to ensure a good responsiveness when finishing the neutral control and fully engaging the first clutch C1 to start propelling the vehicle, as well as minimizing the load on the engine 12. The actual speed ratio e of the torque converter 14 is smaller than 1.0 (NT<NE) when the vehicle is at a standstill at "D" position, namely, in the forward drive mode, and becomes closer to 1.0 under fully neutral states where the clutch engagement pressure PC1 to the first clutch C1 is zero, i.e., no load is given to the output side of the torque converter 14. The actual speed ratio e of the torque converter 14, on the other hand, decreases with an increase in the clutch engagement pressure PC1, i.e., an increase in the load on the output side of the torque converter 14. The neutral speed ratio eN, the speed ratio of the torque converter 14 under fully neutral states, decreases as the AT fluid temperature TOIL decreases, i.e., as the viscosity of the hydraulic fluid supplied to the torque converter 14 increases. Also, the neutral speed ratio eN decreases as the engine speed NE corresponding to the input speed of the torque converter 14 decreases. Therefore, the map of FIG. 8 is formulated based on certain experimental results, or the like, such that the reference speed ratio ebase continuously decreases as the AT fluid temperature TOIL decreases and as the engine speed NE decreases.

Figure 9:
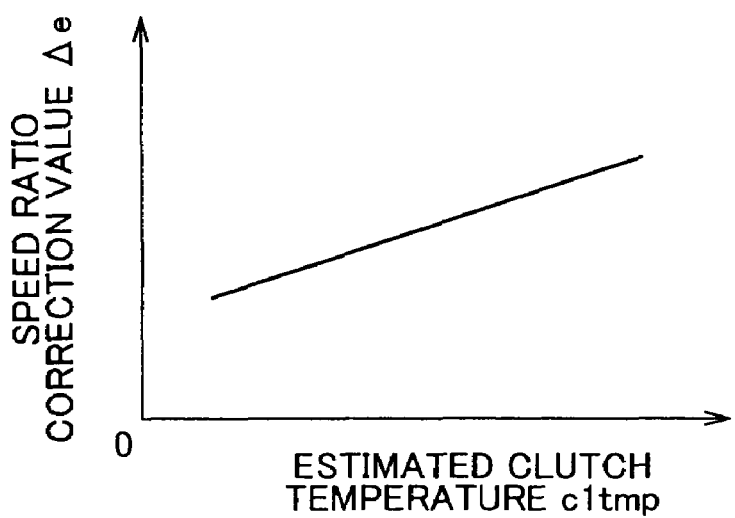
FIG. 9 is one example of a control map for obtaining a speed ratio correction value Δe in step SA5 in FIG. 7.

In step SA4, the neutral control portion 120 reads the estimated clutch temperature cltmp that is regularly obtained and updated according to the routine of FIG. 10 and recorded in a certain recording device or memory. In step SA5, the neutral control portion 120 calculates a speed ratio correction value Δe by applying the estimated clutch temperature cltmp to a map as shown in FIG. 9 which uses it as a parameter, or by applying the estimated clutch temperature cltmp to particular formulas or expressions. The speed ratio correction value Δe is used in order to avoid the endurance of the first clutch C1 being reduced due to an increase in its temperature as a result of being made to slip (be slip-engaged) during the neutral control. More specifically, the speed ratio correction value Δe is set such that the engagement load of the first clutch C1, i.e., the clutch engagement pressure PC1, decreases, in other words, the target speed ratio etarget increases, as the estimated clutch temperature cltmp increases. Therefore, the map of FIG. 9 is formulated based on certain experimental results, or the like, such that the speed ratio correction value Δe continuously increases as the estimated clutch temperature cltmp increases.

In step SA6, the neutral control portion 120 obtains a target speed ratio etarget by adding the speed ratio correction value Δe obtained in step SA5 to the reference speed ratio ebase obtained in step SA3 according to Expression (4) below.

$$etarget = ebase + \Delta e \quad (4)$$

In step SA7, the neutral control portion 120 adjusts the clutch engagement pressure PC1 to the first clutch C1 through feedback control of exciting current to the solenoid valve SL1 so as to bring the actual speed ratio e of the torque converter 14 to the target speed ratio etarget. More specifically, if the actual speed ratio e is smaller than the target speed ratio etarget, the neutral control portion 120 reduces the clutch engagement pressure PC1, thus the engagement load of the torque converter 14, according to the difference between the actual speed ratio e and the target speed ratio etarget. If the actual speed ratio e is larger than the target speed ratio etarget, conversely, the neutral control portion 120 increases the clutch engagement pressure PC1, thus the engagement load of the torque converter 14, according to the difference between the actual speed ratio e and the target speed ratio etarget. The actual speed ratio e (=NT/NE) is obtained by the speed ratio calculation block 128 from the turbine speed NT detected by the turbine speed sensor 66 and the engine speed NE detected by the engine speed sensor 50.

Due to such feedback control, when the estimated clutch temperature cltmp increases, the target speed ratio etarget in turn increases by the speed ratio correction value Δe. Then, in response to the increase in the target speed ratio etarget, the clutch engagement pressure PC1 decreases so that the actual speed ratio e increases, in other words, the load on the torque converter 14 decreases. As a result, the engagement load of the first clutch C1 becomes smaller, suppressing an increase in the temperature of the first clutch C1.

In step SA8, the neutral control portion 120 determines whether conditions for finishing the neutral control are satisfied. The conditions include, but are not limited to, one or more of the foot brake being released, the accelerator pedal 42 being stepped down, the shift lever 78 having been shifted from "D" position to other position, and so on, as contrasted to the foregoing staring conditions. If the conditions for finishing the neutral control are not satisfied, the routine returns. Further, the conditions for finishing the neutral control may also include various other conditions, such as the estimated clutch temperature cltmp exceeding a particular level over which reduction of the endurance of the first clutch C1 is concerned and the estimated clutch temperature cltmp having been above a certain level for a predetermined period of time or longer. When such conditions are satisfied, the neutral control portion 120 finishes the neutral control in step SA9. At this time, if the neutral control is finished to start propelling the vehicle at "D" position, the neutral control portion 120 will fully engage the first clutch C1. On the contrary, if the neutral control is finished in response to the shift lever 78 having been shifted from "D" position to other position like "N" position, the neutral control portion 120 will release the first clutch C1.

As described above, according to the first exemplary embodiment, the actual speed ratio e of the torque converter 14 is controlled so as to be equal to the target speed ratio etarget through the foregoing feedback control of the clutch engagement pressure PC1 to the first clutch C1, where the larger the estimated clutch temperature cltmp obtained by the clutch temperature estimation block 122 is, the larger the target speed ratio setting block 124 makes the target speed ratio etarget so that the clutch engagement pressure PC1 decreases.

As a result, the actual speed ratio e becomes larger whereby a state close to the foregoing fully neutral state is established which produces less friction heat at the first clutch C1 (friction heat due to slip-engagement). Accordingly, it is possible to maintain the endurance of the first clutch C1 while enabling continuation of the neutral control for better fuel economy. Also, because, during the aforementioned neutral control, the automatic transmission 16 is not placed in the fully neutral state and the target speed ratio etarget decreases and the clutch engagement pressure PC1 increases as the estimated clutch temperature cltmp decreases, it is also possible to ensure a good responsiveness when fully engaging the first clutch C1 to start propelling the vehicle after finishing the neutral control.

Furthermore, according to the first exemplary embodiment, because the speed ratio correction value Δe increases with an increase in the estimated clutch temperature cltmp as illustrated in FIG. 9, the target speed ratio etarget continuously changes in accordance with the estimated clutch temperature cltmp. Thus, as compared to, for example, the case where the target speed ratio etarget of the torque converter 14 is simply switched between two levels according to the estimated clutch temperature cltemp, the clutch engagement pressure PC1 to the first clutch C1 can be more minutely and accurately controlled in accordance with the estimated clutch temperature cltmp, which results in smaller changes in the clutch engagement pressure PC1 and the estimated clutch temperature cltmp. This further enhances the effect that the endurance of the first clutch C1 can be maintained while enabling continuation of the neutral control.

Meanwhile, because the speed ratio correction value Δe increases as the estimated clutch temperature C1temp increases in the first exemplary embodiment, it is conceivable that, depending upon the formulation of the control map of FIG. 9, the target speed ratio etarget will become excessively close to, or higher than, the fully neutral speed ratio eN. In this case, the first clutch C1 will be fully, or almost fully, engaged and this will increase the possibility that engagement shocks occur when starting to propel the vehicle after return from the neutral control and the possibility that the responsiveness from full engagement of the first clutch C1 to starting of the vehicle will be impaired. Another possibility in this case is that the actual speed ratio e of the torque converter 14 can not be increased, that is, the target speed ratio etarget can not be achieved even if the clutch engagement pressure PC1 is reduced sufficiently.

Figure 7:
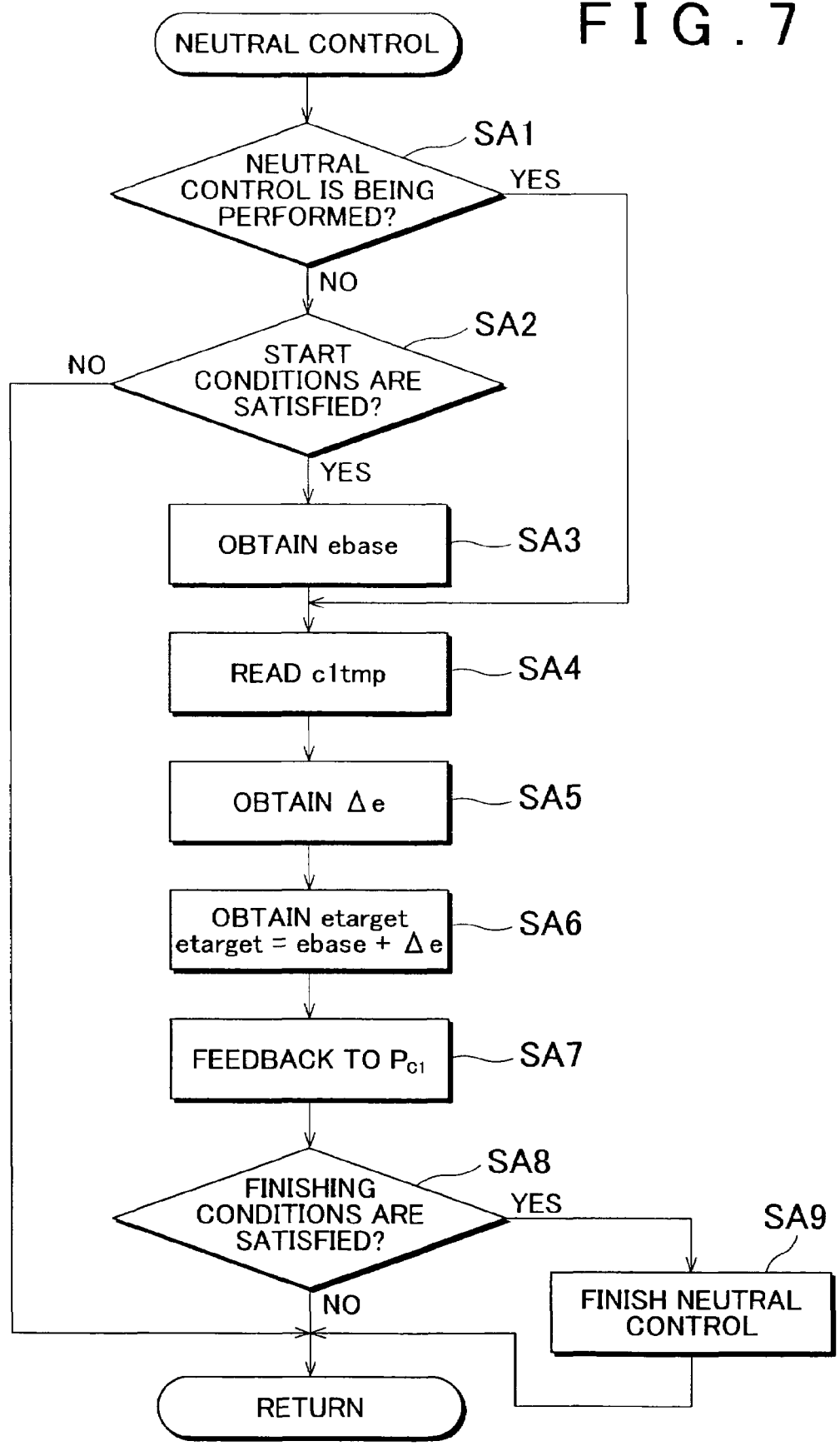
FIG. 7 is a flowchart illustrating a routine executed by the neutral control portion in FIG. 6.
Figure 12A:
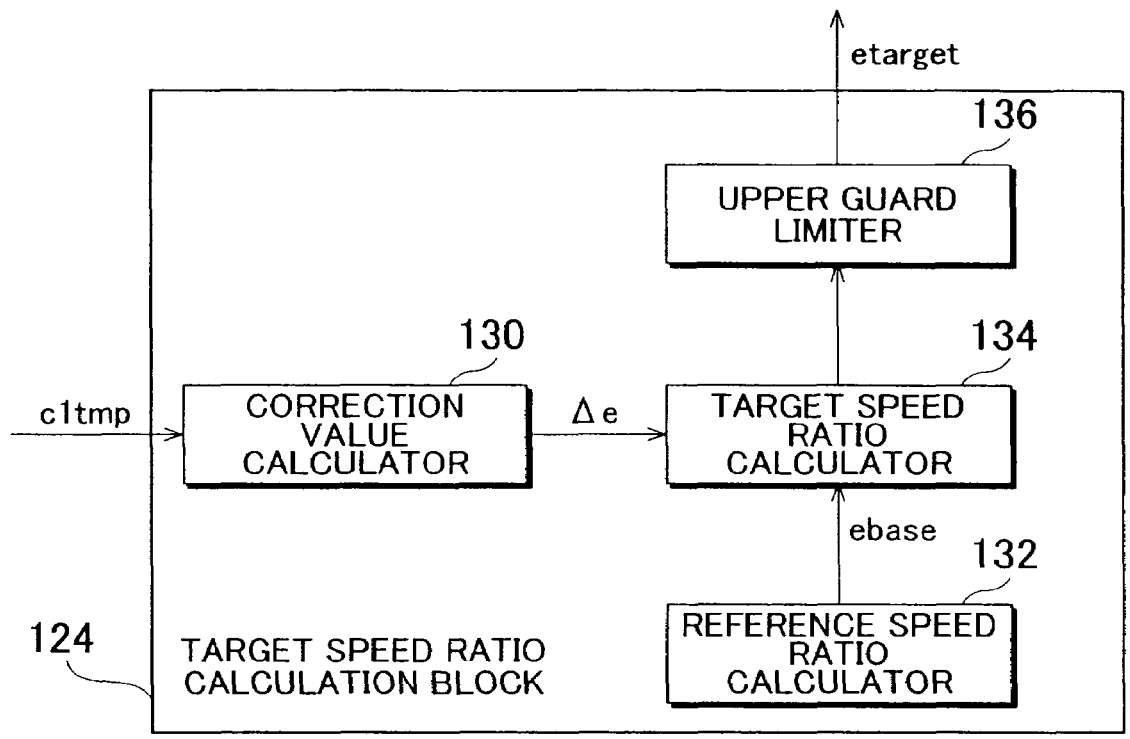
FIGS. 12A, 12B show additional functional blocks for the configuration of FIG. 6 and additional steps for the routine of FIG. 7, respectively, which are incorporated in a neutral control apparatus according to another exemplary embodiment of the invention.
Figure 12B:
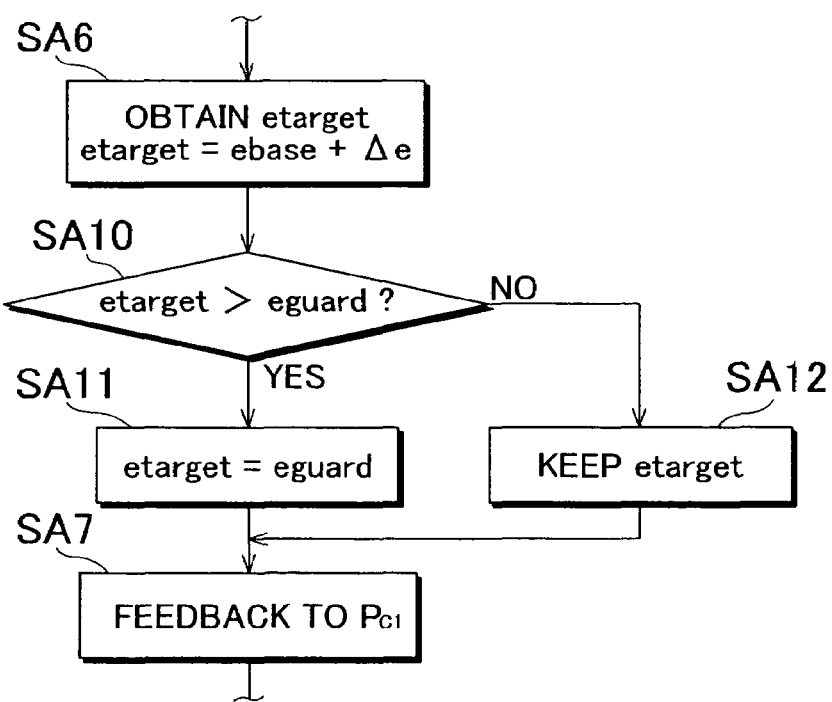

In view of such possibilities, the target speed ratio setting block 124 may be modified to add an upper guard limiter 136 as shown in FIG. 12A, and the routine of FIG. 7 may be modified to add steps SA10 to 12 as shown in FIG. 12B, which will be executed by the upper guard limiter 136. In this case, step SA10 is executed after step SA6 to determine whether target speed ratio etarget is larger than an upper guard value eguard. If "YES" (etarget>eguard), step SA11 is executed to make the target speed ratio etarget equal to the upper guard value eguard (etarget=eguard). If "NO" (etarget≦eguard), conversely, step SA12 is alternatively executed to keep the target speed ratio etarget unchanged. Because the upper guard value eguard is basically used to prevent the target speed ratio etarget from becoming excessively close to the fully neutral speed ratio eN and thus avoid full engagement of the first clutch C1, it is desirable that the upper guard value eguard be set to a value between the fully neutral speed ratio eN and the reference speed ratio ebase by, for example, applying the AT fluid temperature TOIL and the engine speed NE to a particular control map, formulas, or expressions.

Thus, because the upper guard means 126 limits the target speed ratio etarget below the predetermined upper guard value eguard, it eliminates the possibility that the target speed ratio etarget will exceed the fully neutral speed ratio eN and the actual speed ratio e will therefore be unable to increase even if the engagement pressure PC1 is reduced sufficiently. Further, the use of the upper guard means 126 eliminates the possibility that the first clutch C1 will be fully engaged, therefore shift shocks will not occur when starting propelling the vehicle after return from the neutral control and the responsiveness until the vehicle starts moving will not be impaired.

While the invention has been described with reference to exemplary embodiments thereof, it is to be understood that the invention is not limited to the exemplary embodiments or constructions. To the contrary, the invention is intended to cover various modifications and equivalent arrangements other than described above. In addition, while the various elements of the exemplary embodiments are shown in various combinations and configurations, which are exemplary, other combinations and configurations, including more, less or only a single element, are also within the spirit and scope of the invention.

What is claimed is:

1. A neutral control apparatus for an automatic transmission of a vehicle, comprising:

an engagement load adjustment device that adjusts an engagement load of a friction engagement device of the automatic transmission, to which drive power is transmitted from a drive power source of the vehicle via a torque converter; and a controller that performs, when the vehicle is at a standstill, a neutral control by reducing the engagement load of the friction engagement device, the controller being adapted to:

estimate a temperature of the friction engagement device;

calculate a target speed ratio of the torque converter according to the estimated temperature of the friction engagement device, the speed ratio being a ratio of an output speed to an input speed of the torque converter, the target speed ratio being calculated to be larger when the estimated temperature of the friction engagement device is higher; and control the engagement load adjustment device so as to achieve the target speed ratio during the neutral control.

2. The neutral control apparatus according to claim 1, wherein:

the controller is further adapted to limit the target speed ratio to or below an upper guard value.

3. The neutral control apparatus according to claim 1, wherein: the controller is further adapted to continuously increase the target speed ratio as the estimated temperature of the friction engagement device increases.

4. The neutral control apparatus according to claim 3, wherein:

the controller is further adapted to limit the target speed ratio to or below an upper guard value.

5. The neutral control apparatus according to claim 1, wherein:

the controller is further adapted to make the estimation of the temperature of the friction engagement device based on at least one of a speed ratio of the torque converter, a speed of the drive power source, a temperature of fluid of the automatic transmission, and a time period that the neutral control continues.

6. The neutral control apparatus according to claim 5, wherein the controller is adapted to obtain a first coefficient by applying the speed ratio of the torque converter and the speed of the drive power source to a first map, a second coefficient by applying the temperature of fluid of the automatic transmission to a second map, and a third coefficient by applying the time period that the neutral control continues to a third map.

7. The neutral control apparatus according to claim 6, wherein the controller is adapted to calculate an estimated temperature increase equal to K1×K2×K3, where K1 is the first coefficient, K2 is the second coefficient, and K3 is the third coefficient.

8. A method for performing a neutral control in a vehicle equipped with an automatic transmission, comprising:

starting a neutral control by reducing an engagement load of a friction engagement device of the automatic transmission when the vehicle is at a standstill, the friction engagement device being drivingly connected to a drive power source of the vehicle via a torque converter;

estimating a temperature of the friction engagement device;

calculating a target speed ratio of the torque converter that increases as the estimated temperature of the friction engagement device increases, the speed ratio being a ratio of an output speed to an input speed of the torque converter; and adjusting the engagement load of the friction engagement device so as to achieve the increased target speed ratio.

9. The method according to claim 8, wherein:

increasing the target speed ratio as the estimated temperature of the friction engagement device increases includes increasing the target speed ratio continuously as the estimated temperature of the friction engagement device increases.

10. The method according to claim 8, further comprising:

determining whether the increased target speed ratio is above an upper guard value; and limiting the increased target speed ratio to or below the upper guard value if the set target speed ratio is above the upper guard value.

11. The method according to claim 8, wherein:

estimating the temperature of the friction engagement device includes making said estimation based on at least one of a speed ratio of the torque converter, a speed of the drive power source, a temperature of fluid of the automatic transmission, and a time period that the neutral control continues.

12. The method according to claim 11 wherein a first coefficient is obtained by applying the speed ratio of the torque converter and the speed of the drive power source to a first map, a second coefficient is obtained by applying the temperature of fluid of the automatic transmission to a second map, and a third coefficient is obtained by applying the time period that the neutral control continues to a third map.

13. The method according to claim 12, wherein the an estimated temperature increase is calculated by $K1 \times K2 \times K3$, where K1 is the first coefficient, K2 is the second coefficient, and K3 is the third coefficient.

* * * * *